United States Patent [19]
Moravec

[11] Patent Number: 5,890,419
[45] Date of Patent: Apr. 6, 1999

[54] TOP SIDE COOKER WITH SPRING RAM ASSEMBLY

[75] Inventor: Joseph V Moravec, Downers Grove, Ill.

[73] Assignee: Keating of Chicago, Inc., Bellwood, Ill.

[21] Appl. No.: 936,411

[22] Filed: Sep. 25, 1997

[51] Int. Cl.⁶ .............................. A47J 37/00; A47J 37/06
[52] U.S. Cl. .................................. 99/349; 99/372; 99/379
[58] Field of Search .............................. 99/349, 353, 355, 99/426, 432, 372–380, 422–425, 389, 390, 391, 394; 219/524, 525, 443, 388; 425/136, 151, 160, 298, 324.1, 343, 293, 317, 394; 426/496, 512; 100/92, 315, 319, 320, 233

[56] References Cited

U.S. PATENT DOCUMENTS

| | | | |
|---|---|---|---|
| 3,880,064 | 4/1975 | Martinez | 99/349 |
| 4,601,237 | 7/1986 | Harter et al. | 99/379 X |
| 4,697,504 | 10/1987 | Keating | 99/331 |
| 4,763,571 | 8/1988 | Bergling et al. | 99/372 X |
| 4,972,766 | 11/1990 | Anetsberger | 99/332 |
| 5,197,377 | 3/1993 | Jennings et al. | 99/378 |
| 5,341,727 | 8/1994 | Dickson | 99/335 |
| 5,473,976 | 12/1995 | Hermansson | 99/349 |
| 5,531,155 | 7/1996 | Pellicane et al. | 99/372 |

*Primary Examiner*—Timothy F. Simone
*Attorney, Agent, or Firm*—Nicholas A. Camasto

[57] ABSTRACT

A top side cooker includes a cooking head that is counterbalanced by a pair of gas cylinders. A lift arm couples the gas cylinders to the cooking head. A compression spring is fitted on the rod of each gas cylinder to provide a positive force at the end of the rod travel for precluding the heavy cooking head from crashing into the grill surface.

4 Claims, 2 Drawing Sheets

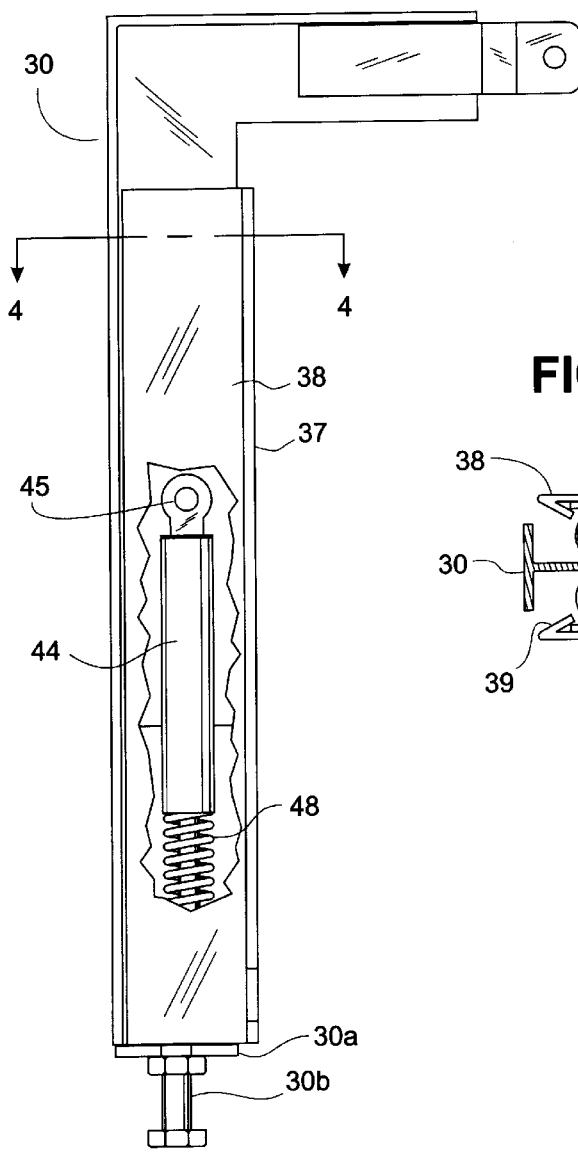
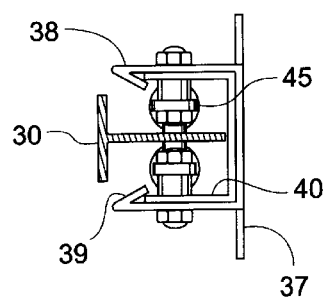
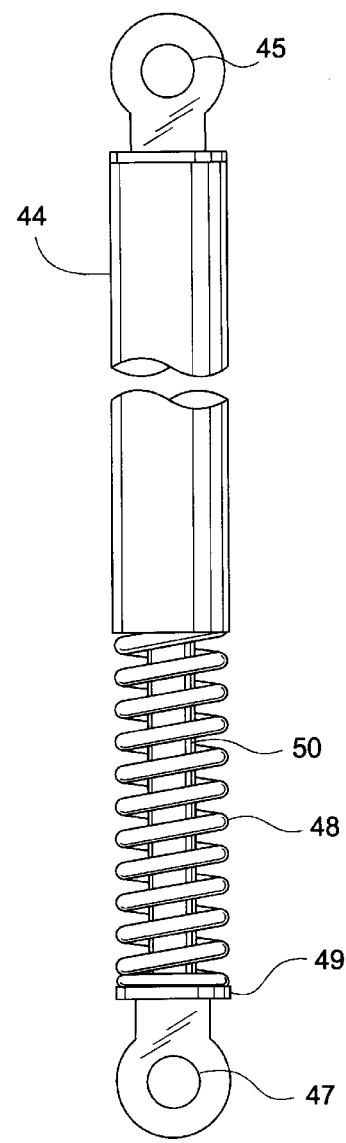
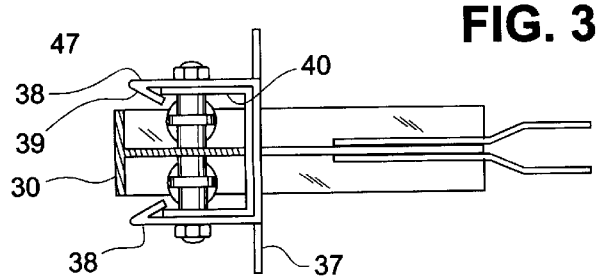

TOP SIDE COOKER WITH SPRING RAM ASSEMBLY

BACKGROUND OF THE INVENTION AND PRIOR ART

This invention relates generally to cooking grills and specifically to so-called top side cooking grills that include an upper cooking head that is movably mounted between an upper, open position and a lower, cooking position in close proximity to a cooking surface.

Top side cookers have been in use for many years and have the advantage of accelerating the cooking of foodstuffs, such as hamburger, by applying heat and pressure to both sides thereof during the cooking process. The upper cooking head is relatively massive and accordingly has significant weight, which of course is required to apply pressure to the foodstuff. The top side cooker manufactured by Keating of Chicago, Inc. has an upper head that is counterbalanced by a pair of gas springs, i.e., pistons that are under a constant pressure. Adjustment of the springs and the associated lifting mechanism to enable a smooth force transition from the upper position to the lower position of the cooking head is often difficult to accomplish, especially since the weight of the cooking head is required to apply pressure to the foodstuffs being cooked. In many instances, the cooking head must be prevented from forcefully impacting the grill surface when it is being lowered into the cooking position. When the mechanism is properly adjusted, the cooking head is free of the counterbalance force when it is very close to the cooking position. This enables the weight of the cooking head to apply pressure to the foodstuffs. Failure of the operator to control movement of the cooking head or failure of one of both of the gas springs could result in the cooking head closing with a substantial force and exposing the operator to potential injury as well as causing damage to the surface of the cooking gill.

The present invention solves the above problems of the prior art in a relatively simple and cost effective manner by providing a cushioning spring on the gas cylinder which prevents forceful engagement between the upper cooking head and the lower grill surface.

OBJECTS OF THE INVENTION

A principal object of the invention is to provide a novel top side cooker mechanism.

Another object of the invention is to provide a top side cooker mechanism that eliminates the possibility of accidental forceful contact between the upper cooking head and the grill surface.

A further object of the invention is to provide a top side cooker that is easier and safer to use.

BRIEF DESCRIPTION OF THE DRAWINGS

These and other objects and advantages of the invention will be apparent upon reading the following description in conjunction with the drawings in which:

FIG. 2 is a side view of the lift arm of the top side cooker of FIG. 1 that is partially cut away to reveal the gas cylinder and spring of the invention;

FIG. 3 is an end view of the structure of FIG. 2;

FIG. 4 is a sectional view taken along the line 4—4 of FIG. 2; and

FIG. 5 illustrates the gas cylinder and spring of the invention.

DESCRIPTION OF THE PREFERRED EMBODIMENT

Figure 1:
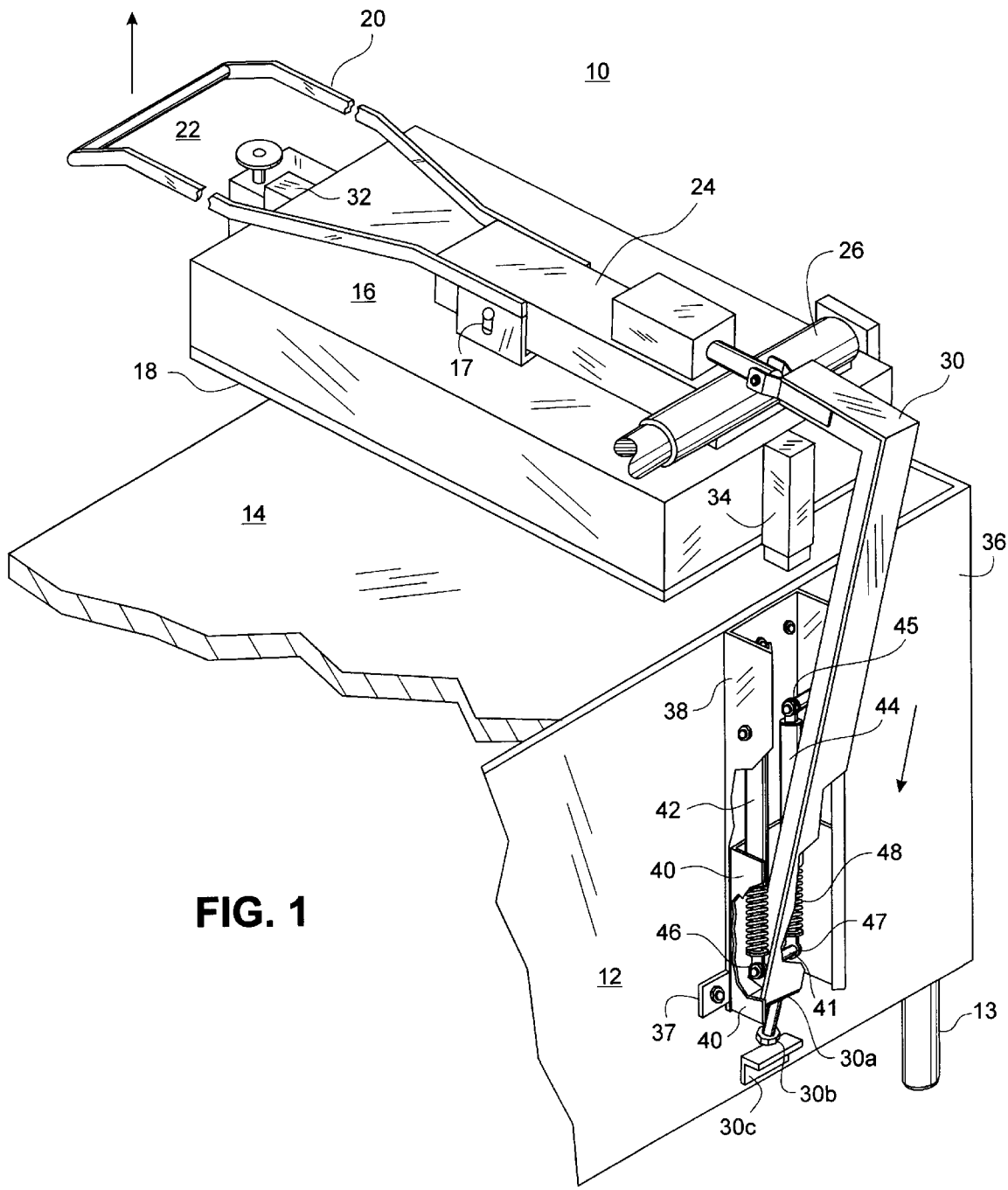
FIG. 1 is a partial simplified view of a top side cooker constructed in accordance with the invention.

Referring to FIG. 1 of the drawings, a top side cooker assembly 10 includes a body 12 having one or more legs 13 for supporting a cooking grill 14 that is heated by any suitable means (not shown). A movable upper cooking head 16 (also heated by well-known means, not shown) is suspended for arcuate movement between an upper, open position and a lower, cooking position in which cooking surface 18 of cooking head 16 is positioned close to cooking grill 14. Cooking head 16 is manually movable in an arcuate path between the two positions in response to an operator raising and lowering a handle 20 that is connected to a supporting arm 24 positioned over cooking head 16. In the construction of the Keating of Chicago top side cooker, cooking head 16 is pivotally connected at the rear to a pivot structure 26 and to a lift arm 30 and includes a pair of simultaneously adjustable height adjusters 22 and 34 at the front and rear of the cooking head for changing the space between cooking surface 18 and grill 14. Cooking head 16 is supported for limited vertical movement with respect to arm 24 by a pin and slot arrangement 17. Thus, the cooking head is suspended in a "semi-floating" manner. The pivotal connection at the rear of cooking head 16 to lift arm 30 is indicated at 26.

As best seen in FIGS. 3 and 4, lift arm 30 is "L" shaped and has a "T" shaped cross section. A generally U-shaped frame 38 is secured to the rear 36 of body 12 and, by virtue of its inwardly directed flanged edges 39, confines a smaller U-shaped slide unit 40 to longitudinal movement therein. Frame 38 may be secured to housing 12 by any suitable means, including the flanges 37 that are illustrated. The lower end of lift arm 30 is pivotally connected to the lower end of slide unit 40 and also to the lower ends of a pair of gas cylinder/spring devices 42 and 44 by a pin 41. The upper ends of the gas cylinder/spring devices are pivotally connected to the sides of frame 38. Thus it should be apparent that as handle 20 is moved upwards, cooking head 16 is moved in an arcuate manner between its lower, cooking position and its upper, open position. Lift arm 30 is moved both horizontally and vertically downward (as indicated by the arrows adjacent handle 20 and lift arm 30) and conveys a counterbalancing force to offset the weight of the cooking head. Its vertical movement is enabled by slide 40 that moves, in a confined manner, within frame 38, with gas cylinders 42 and 44 providing the counterbalancing force. A plate 30a is affixed to the lower end of lift arm 30 and a screw and lock nut arrangement 30b cooperates with a stop 30c on the rear 36 of body 12 to limit the downward travel of lift arm 30 and hence defines the upper position of cooking head 16. It will be appreciated that stop 30c may also conveniently be made a part of frame 38.

In accordance with the present invention, the gas cylinders include springs 46 and 48 that exert a residual positive supporting force when cooking head 16 approaches the cooking (lowered) position. As seen in FIG. 5, spring 48 encircles the rod 50 of cylinder 44 and is compressed between the body of the cylinder and a washer 49 that abuts end piece 47. The cylinder/spring arrangement may be manufactured by cutting the rod of the cylinder and rewelding after the spring and washer have been positioned thereover. The effect is that a residual force is always present to cushion the movement of the cooking head as it approaches the cooking position despite failure of the operator to control the cooking head movement or "bottoming out" of one or both of the gas springs. Those skilled in the art will appreciate that the cooking head may weigh on the order of 100 pounds and therefore, even a slight misadjustment of the top side cooker mechanism or diminished performance of the gas springs can have sometimes serious consequences.

Thus, with the invention, the problem of the cooking head inadvertently crashing into the grill surface with consequent damage thereto and the possibility of such occurrence causing injury to an operator due to grease spattering or the like is obviated.

What has been described is a novel gas cylinder/spring arrangement for a top side cooker that obviates the problem of the upper cooking head crashing into the grill surface and potentially damaging the grill or causing injury to an operator. It is recognized that numerous changes to the described embodiment of the invention will occur to those skilled in the art without departing from its true spirit and scope. The invention is to be limited only as defined in the claims.

What is claimed is:

1. A top side cooker comprising:

a grill surface;

a cooking head supported for arcuate movement above said grill surface;

a frame secured to the rear of said cooker;

a slide mounted for longitudinal movement in said frame;

a gas cylinder and a lift arm, having one end connected to said gas cylinder and another end connected to said cooking head, for exerting a counterbalancing force on said cooking head during arcuate movement of said cooking head from an open position to a closed position that is adjacent to a cooking position close to said grill surface;

a spring encircling the rod of said gas cylinder for supporting said cooking head adjacent to said closed position; and said gas cylinder and said lift arm being connected to said slide.

2. The cooker of claim 1, wherein said lift arm has an L-shaped configuration.

3. A top side cooker comprising:

a grill surface;

a cooking head supported for arcuate movement from an open position above said grill surface to a closed position adjacent to a cooking position close to said grill surface;

a gas cylinder;

a lift arm coupled to said cooking head and to said gas cylinder, said gas cylinder exerting a counterbalancing force on said cooking head during arcuate movement thereof; and a spring on said gas cylinder for supporting said cooking head adjacent to said closed position;

wherein said lift arm is substantially L-shaped and further including:

a second gas cylinder and a second spring coupled to said lift arm;

a frame secured to the rear of said cooker;

a slide mounted for longitudinal movement in said frame; and said gas cylinders and said lift arm being connected to said slide.

4. The cooker of claim 3, wherein said lift arm has a substantially T-shaped cross section and wherein said lift arm and said gas cylinders are coupled to said slide by a pin.

* * * * *